US00RE39642E

(19) United States
(12) Reissued Patent
Gobeli

(10) Patent Number: US RE39,642 E
(45) Date of Reissued Patent: May 22, 2007

(54) SPATIAL LIGHT MODULATOR AND METHOD

(75) Inventor: Garth W. Gobeli, Albuquerque, NM (US)

(73) Assignee: Alan J. Leszinske, Albuquerque, NM (US)

(21) Appl. No.: 10/725,361

(22) Filed: Dec. 1, 2003

Related U.S. Patent Documents

Reissue of:
(64) Patent No.: 5,768,003
Issued: Jun. 16, 1998
Appl. No.: 08/555,494
Filed: Nov. 8, 1995

(51) Int. Cl.
*G02F 1/03* (2006.01)

(52) U.S. Cl. ..... 359/254; 359/322
(58) Field of Classification Search ..... 359/245, 359/252, 254, 255, 258, 322, 323
See application file for complete search history.

(56) References Cited

U.S. PATENT DOCUMENTS 3,940,201 A * 2/1976 Micheron et al. ..... 365/125
3,955,190 A * 5/1976 Teraishi ..... 345/32
4,053,207 A * 10/1977 Keve et al. ..... 359/252
4,379,621 A * 4/1983 Ikedo et al. ..... 359/254
4,793,697 A * 12/1988 Wu et al. ..... 359/254
4,816,381 A * 3/1989 Kaukeinen ..... 430/319
4,867,543 A * 9/1989 Bennion et al. ..... 359/259
4,990,943 A * 2/1991 Phillips ..... 359/246
5,198,920 A * 3/1993 Gobeli et al. ..... 359/245
5,221,989 A * 6/1993 Stappaerts et al. ..... 359/323
5,260,719 A * 11/1993 Maloney ..... 347/135

OTHER PUBLICATIONS

"Photoconductive Activated Light Valve for High Definition Projection System", by Garth Gobeli and Thomas Toor, SPIE vol. 1664 High–Resolution Displays and Projection Systems (1992), pp. 172–176.*

* cited by examiner

*Primary Examiner*—Hung Xuan Dang
*Assistant Examiner*—Joseph Martinez
(74) *Attorney, Agent, or Firm*—Cahill, von Hellens & Glazer P.L.C.

(57) ABSTRACT

A spatial light modulator including a thin layer of solid-state electro-optical material having parallel, opposite first and second surfaces, an elongated first electrode disposed on the first surface and a plurality of spaced, elongated second electrodes disposed on the second surface and generally perpendicular to the first electrode. The layer of solid-state electro-optical material has a thickness in the range of approximately 5 to 15 microns, and is composed of PLZT. In one embodiment, a plurality of thin regions of insulator are disposed on the first surface between portions of the first electrode and the electro-optical material.

14 Claims, 3 Drawing Sheets

SPATIAL LIGHT MODULATOR AND METHOD

Matter enclosed in heavy brackets [ ] appears in the original patent but forms no part of this reissue specification; matter printed in italics indicates the additions made by reissue.

BACKGROUND OF THE INVENTION

The invention relates to spatial light modulators, and more particularly to improvements therein which result in low voltage, high speed devices with high contrast ratios.

PLZT (lanthanum modified lead zirconium titanate) is well known for use in spatial light modulators (SLMs), or "light valves". U.S. Pat. No. 5,198,920 by the present inventor gives general background on spatial light modulators. Also see the article "Photoconductive Activated Light Valve for High Definition Projection System", by Garth Gobeli and Thomas Toor, 172/SPIE vol. 1664 High-Resolution Displays and Projection Systems (1992).

FIG. 1 shows a prior art spatial light modulator formed in a relatively thick (e.g., 200 microns) substrate 10 of PLZT. On the top surface 15A there are formed various positive electrodes, for example, positive electrodes 11 and 13, and various negative electrodes, such as negative electrodes 12 and 14, interspaced between the positive electrodes. The opposite voltages applied to the positive and negative electrodes produce "fringing" electric fields 15 between the positive and negative electrodes underneath upper surface 15 of PLZT substrate 10. The presence or absence of the fringing fields 15 modulate or control the amount of light that can pass through the spatial light modulator or light valve 1.

A substantial problem of the above prior art of FIG. 1 is that the fringing electric fields 15 are relatively nonuniform. This non-uniformity results in the necessity of applying large voltage differences, usually more than 60 volts, between the positive and negative electrodes in order to achieve the desired level of light modulation. It would be very desirable to be able to use lower electrode voltage differences of less than 60 volts. The non-uniformity of the fringing electric field also means that memory mode material cannot be employed as a substrate.

Very thin layers of PLZT material of thickness in the range from 0.01 to 0.08 microns have been fabricated by depositing PLZT material onto a suitable substrate, using sputtering or liquid phase deposition techniques. Such very thin PLZT films require high activation voltages which lie well to the left of the minimum "A" shown in the curve of "PLZT operating voltage versus PLZT layer thickness" shown in subsequently described FIG. 8. Also, PLZT substrates with thicknesses in the 100 to 200 micron range have been fabricated by conventional grinding and polishing techniques, but the substrates of this thickness range require very high operating voltages that lie far to the right of the minimum "PLZT operating voltage versus PLZT layer thickness" shown in the curve of FIG. 8.

There would be a great many applications in the fields of optical computing, optical projectors, and large dynamic range cameras, for a two-dimensional spatial light modulator array in which each spatial light modulator cell operates with voltages less than approximately 60 volts, at operating speeds of more than approximately one million operations per second, and with a contrast ratio of greater than approximately 512 to 1.

Until now, no available or proposed spatial light modulator has been capable of meeting all three of these operating objectives. For example, typical liquid crystal devices (LCDs) operate at low voltages (less than 5 volts) but are quite slow, typically switching at about 30 frames per second, and have a low contrast ratio, typically about 12 to 1.

SUMMARY OF THE INVENTION

Accordingly, it is an object of the invention to provide a spatial light modulator capable of operating at low voltages of less than approximately 60 volts.

It is another object of the invention to provide a spatial light modulator which can be directly driven by silicon LSI or VLSI integrated circuits.

It is another object of the invention to provide a spatial light modulator having high operating speed capability which allows more than approximately one million switching or modulation operations per second.

It is another object of the invention to provide a spatial light modulator having a device contrast ratio which is higher than approximately 512 to 1.

It is another object of the invention to provide a spatial light modulator which has a "modulation depth" that is continuously or nearly continuously attainable, to at least 1 point in 512 so as to have at least 512 distinguishable gray scale contrasts.

It is another object of the invention to provide a spatial light modulator with a layer of solid state electro-optical material having an optimum thickness that results in an optimally low activation voltage.

It is another object of the invention to provide a practical technique for making a layer of PLZT of optimum thickness as to achieve optimally low activation voltage in a spatial light modulator.

Briefly described, and in accordance with one embodiment thereof, the invention provides a spatial light modulator including a thin layer (10A) of solid-state electro-optical material having parallel, opposite first (15A) and second (15B) surfaces, an elongated first electrode (22) disposed on the first surface and generally oriented in a first direction, and a plurality of spaced, elongated second electrodes (23) disposed on the second surface and generally oriented in a second direction. Regions in the electro-optical material between portions of the first electrode and portions of the second electrodes define pixel regions (17) through which light selectively passes in response to differences between control voltages applied to the first electrode and the plurality of second electrodes, respectively. In the described embodiment, the first electrode is of serpentine shape, with "pixel-defining" first portions (B) of the first electrode being oriented in the second direction and second portions (A) of the first electrode located between the first portions being oriented in the first direction, which in one described embodiment is perpendicular to the second direction. The layer of solid-state electro-optical material has a thickness in the range of approximately 5 to 15 microns ((micrometers), and is composed of PLZT. In one embodiment, a plurality of thin regions (25) of insulator material are disposed on the first surface between the second portions (A) of the first electrode and the electro-optical material. In one embodiment, the spatial light modulator includes a plurality of the first electrodes (22), the first electrodes and the second electrodes defining a rectangular array of pixel regions (17).

DETAILED DESCRIPTION OF THE PREFERRED EMBODIMENTS

Figure 2:
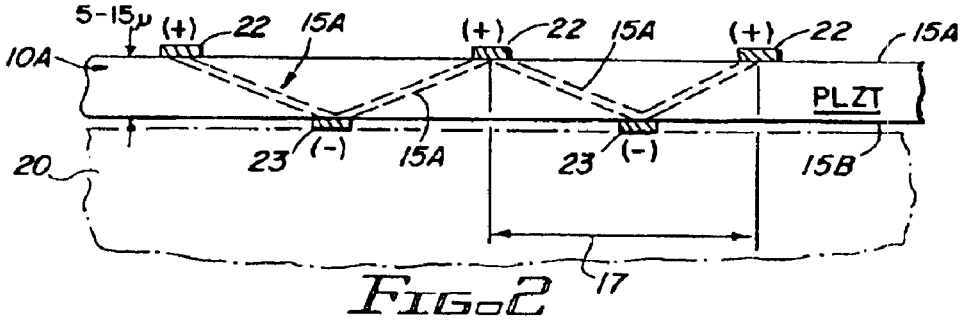
FIG. 2 is a partial sectional view of a "penetrating field" spatial light modulator of the present invention.

FIG. 2 illustrates the basic improvement of the present invention, which includes a PLZT layer that is 5–15 microns thick, which is much more of an optimum thickness than in the most relevant prior art of which the applicant is aware. Obtaining PLZT layers of thickness in this range is very problematic because such a thin wafer can not be handled without considerable risk of breakage. However, grinding and polishing techniques can be used in accordance with the present invention to obtain such thin wafers, which then are attached onto a thicker, more rigid, transparent substrate, such as sapphire, indicated by dashed lines 20 in FIG. 2, to provide structural rigidity.

In accordance with the present invention, the thinness of PLZT layer lOA is what allows electrodes to be placed on both the top surface 15A and the bottom surface 15B of PLZT wafer lOA so as to produce effective "penetrating" electrical fields while maintaining inter-electrode spacings sufficiently small that operating voltages do not exceed 60 volts. (Operating voltage is defined as the voltage that when applied to the device will produce a polarization rotation of 90 degrees and consequently will provide the maximum attainable transmission through a Kerr cell.). Specifically, electrodes 22 are located on the top surface of PLZT layer 10A, and negative electrodes 23 are located on the bottom surface. The electrode patterns can be formed by conventional photolithographic processes similar to those used in the semiconductor industry to pattern the various layers on integrated circuits.

Figure 6:
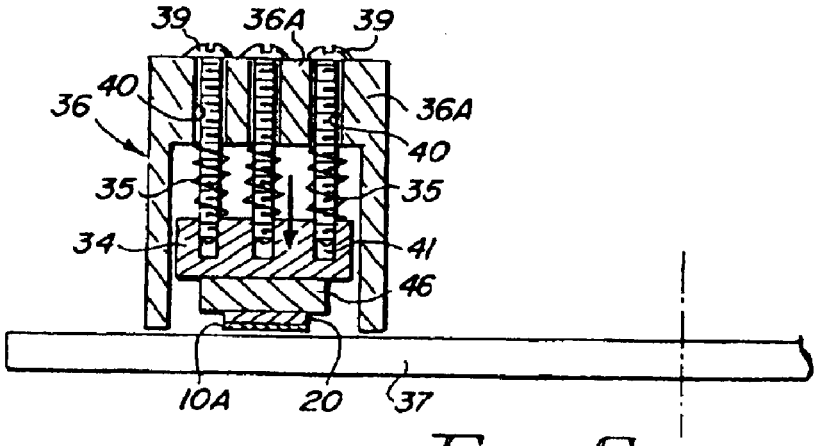
FIG. 6 is a diagram of a device that can be used in conjunction with grinding and polishing techniques used to provide thin PLZT layers in accordance with the present invention.

As a practical matter, the lower electrodes 23 may be initially patterned on thick substrate 20 before PLZT layer lOA is attached to substrate 20, and the upper electrodes 22 can be patterned on the upper surface 15A after PLZT layer lOA is affixed to thick substrate 20 and then lapped and polished using the device of FIG. 6 to obtain the desired 5–15 micron thickness of PLZT layer 10A.

Figure 1:
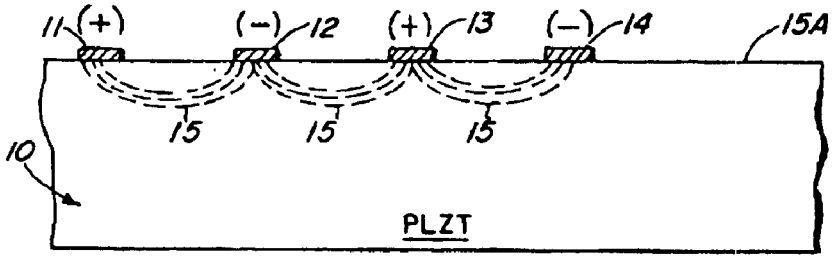
FIG. 1 (PRIOR ART)
FIG. 1 is a section view diagram of a typical prior art PLZT spatial light modulator.

In any case, the provision of both upper electrodes 22 and lower electrodes 23 on a thin PLZT substrate of 5–15 micron thickness results in "penetrating" electric fields 15A that extend all the way through the PLZT wafer 10A, instead of "fringing" fields 15 as shown in prior art FIG. 1. The "penetrating" fields 15A are much more uniform than the fringing fields 15 in FIG. 1. Furthermore, the thinness of PLZT layer lOA results in the advantage that the top electrodes 22 and the bottom electrodes 23 can be placed more closely together on the top surface 15A and the bottom surface 15B, respectively. The electrode spacing on a surface of a penetrating field type of spatial light modulator must be fairly close to the thickness of the layer of light medium, i.e., the PLZT layer 10A. Consequently, lower ioltages are required to produce a polarization rotation of 90 degrees and hence the maximum attainable Kerr cell transmission.

For the structure shown in FIG. 2, my computations indicate that with a PLZT layer thickness of 8 microns, upper electrodes 22 are 2 microns wide and spaced 18 microns apart, and bottom electrodes 23 are 2 microns wide and spaced midway "between" pairs of top electrons 22 as illustrated, for applied "operating voltage" between the (+) electrodes 22 and the (–) electrodes 23 of less than 60 volts to be sufficient to modulate the penetrating fields 15A enough to produce 90 degrees of "rotation" of light passing through PLZT layer 15A. Although I have not yet obtained measurements of the activation or operating voltages of the structure of FIG. 2 with the above-indicated dimensions, I believe, on the basis of both my computations and experiences to date, that whenever I do obtain such measurements, the activation voltage for the optimum PLZT layer thickness may be as low as 30 volts, and perhaps even as low as 15 volts.

Figure 3:
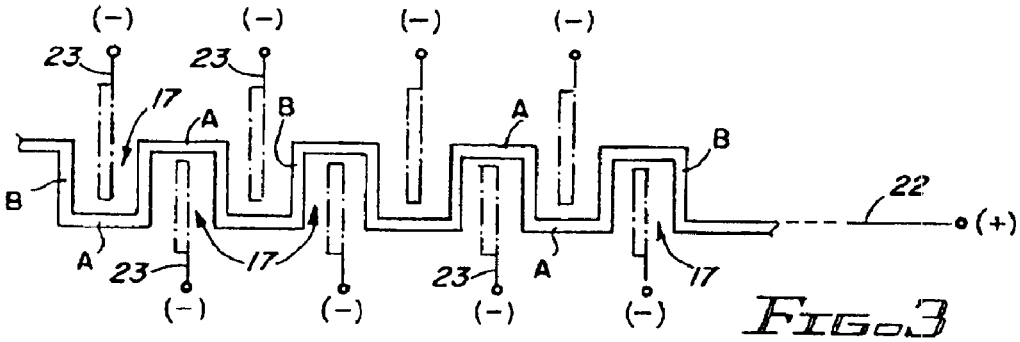
FIG. 3 is a plan view illustrating a one-dimensional spatial light modulator of the present invention.

FIG. 3 illustrates a "plan view" of a "one-dimensional" arrangement of electrodes 22 and 23 of FIG. 2. The thin PLZT layer 10A is omitted for convenience of illustration, and narrow lines are drawn to indicate the electrodes, which actually have a significant width, as seen in the section view of FIG. 2. In FIG. 3, top conductor 22 extends in a snakelike pattern on the top surface of PLZT wafer 10A, and the various electrodes 23 are formed on the bottom surface 15B of PLZT wafer 10A, and are arranged to "fan out" in the directions on opposite sides of conductor 22. This "fan out" has the advantage of allowing use of conveniently sized and conveniently located contact or bonding pads.

Figure 4:
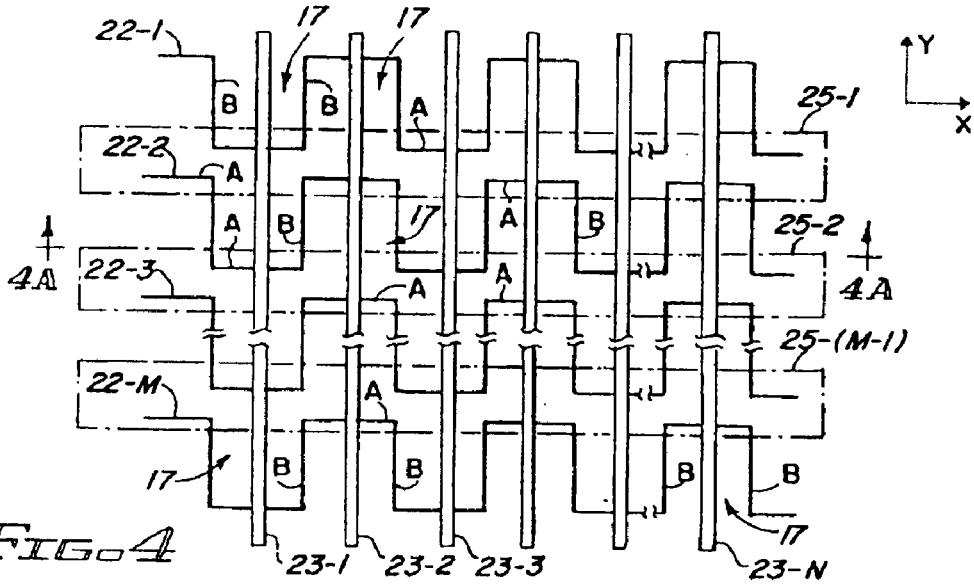
FIG. 4 is a plan view of a two-dimensional spatial light modulator according to the present invention.
Figure 4A:
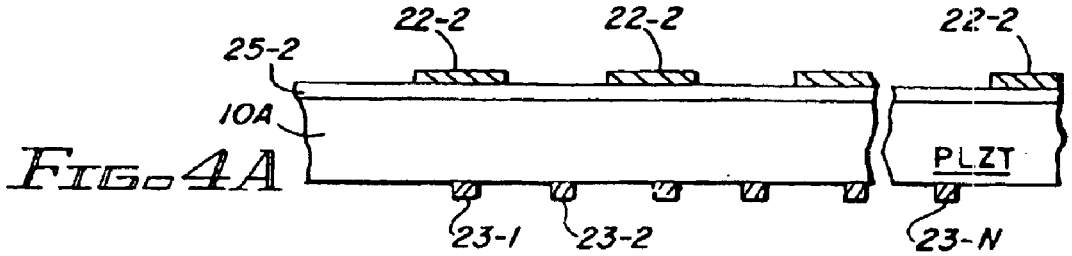
FIG. 4A is a partial section view of the spatial light modulator shown in FIG. 4.

The array shown in FIG. 3 can be made "two-dimensional" as shown in FIGS. 4 and 4A by providing a number of parallel top electrode traces 22-1.2 . . . M that run parallel to but are spaced from each other on the top surface 15A, and by extending the bottom electrodes 23-1.2 . . . N so they are "shared" among the parallel top electrode traces 22.

More specifically, in FIGS. 4 and 4A, a number of generally horizontal serpentine electrodes 22-1.2 . . . M are provided in parallel relationship as shown in FIG. 4 on the top surface 15A of the thin (5–15 microns) PLZT layer 10. On the top surface 15B of thin PLZT layer 10A, a plurality of straight horizontal strips 25-1.2 . . . M of oxide composed of spin-on glass, sputtered $SiO_2$, or other appropriate insulating layer are provided, so as to partially span the "U" or "inverted U" shaped portions of electrodes 22-1.2 . . . M, respectively. A plurality of vertical metal strips 23-1.2 . . . N are formed on the bottom surface 15B of the thin PLZT layer 10A after the oxide strips 23-1.2 . . . N. The oxide strips

25-1.2 . . . M prevent the "horizontal" portions "A" of electrodes 23-1.2 . . . N from contacting the PLZT material.

The "vertical" portions "B" of electrodes 23-1.2 . . . N define pixel areas or regions 17 of PLZT layer 10A through which light may pass under control of voltages applied to electrodes 22 and 23, respectively.

The purpose of the oxide strips 25-1, 25-2, . . . 25-M is to provide an insulated region under-lying all of the horizontal portions A of the "snake-shaped" upper electrodes 22-1.2 . . . M This serves the purpose of preventing significant electric fields and associated "cross talk" from occurring between these horizontal portions of the electrode structure and the lower, y-oriented, electrodes. The upper structure thus provides contact to PLZT layer 10A only along the y-oriented portion of its total length. Thus, the oxide strips 25-M and the "snake-shaped" electrodes 22-1.2 . . . M are on the same (top) surface of PLZT layer 10A, with the oxide being deposited first, and with portions of the snake-shaped electrodes 22-1.2 . . . M on the oxide strips 25-1.2 . . . M, respectively. The oxide strip layers, 25-1.2 . . . M in FIG. 4, are deposited onto the top surface of the PLZT. The snake-shaped electrodes, 22-1.2 . . . M are then deposited onto the top surface of PLZT layer 1OA such that the horizontal (x-oriented) segments thereof lay on top of the oxide layers 25-1.2 . . . M, respectively. The only portions of the electrodes 22-1.2 . . . M that contact the PLZT substrate 10A are the vertical (y-oriented) segments. The bottom side electrodes 23-1.2 . . . N are then deposited so that they are positioned equidistant from adjacent vertical top surface electrode segments.

The only electric fields that penetrate the PLZT layer 10A are between the back surface electrodes and the vertical (y) segments of the top surface electrodes. The electric fields between the horizontal (x-oriented) segments and the back surface electrodes are scre(end out by the intervening oxide layers.

This set of masks can also be employed to fabricate a one-surface-only spatial light modulator device as follows:

(a) First, the snake-shaped electrode structures 22-1.2 . . . M are deposited. (b) Next, the oxide strips 25-1.2 . . . M are deposited in the positions illustrated so that they overlay the horizontal x-oriented segments of the top surface electrodes 22-1.2 . . . M, respectively. (c) Finally, the y-oriented electrodes 23-1.2 . . . N are deposited onto the same surface of the PLZT layer 10A in the positions illustrated.

This configuration depends on utilizing the fringing electric fields between the electrodes 23-1.2 . . . N and the vertical segments of the initially deposited snake-shaped electrodes 22-1.2 . . . M to activate the spatial light modulator.

In the spatial light modulator shown in FIGS. 3 and 4, the widths of the serpentine top conductors 22-1.2 . . . M might be 2 to 4 microns, and the center-to-center spacing of each SLM cell might be 20 to 25 microns. The width of the bottom electrodes 23 might be 2 to 4 microns.

Figure 8:
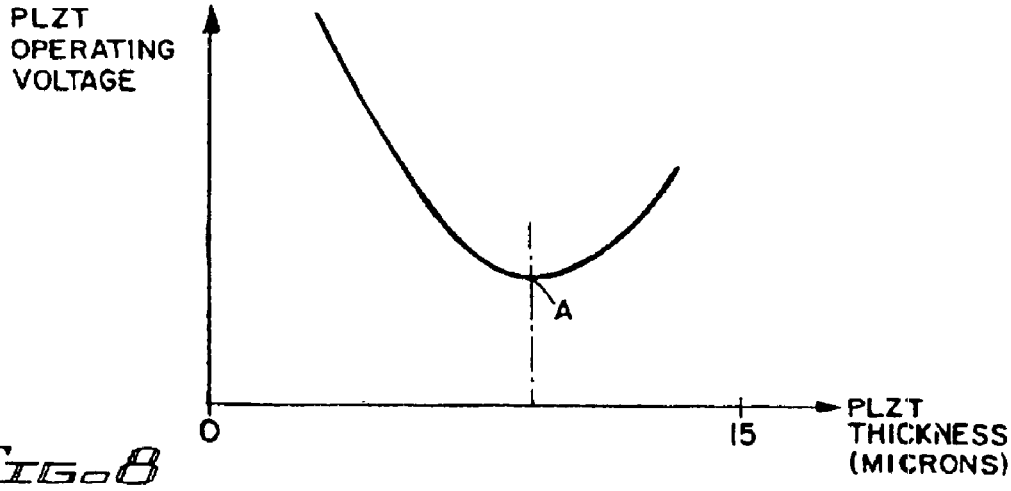
FIG. 8 is a diagram illustrating a plot of the spatial light modulator operating voltage versus PLZT layer thickness when it is configured as a Kerr cell.

FIG. 8 shows a graph of PLZT operating voltage applied between the (+) and (−) electrodes as a function of the thickness of the PLZT layer 10A. The PLZT operating voltage is the voltage require to produce a phase change of 90 degrees in the light propagating through the spatial light modulator. There is a minimum at the PLZT layer thickness indicated by "A", because as the thickness of the PLZT layer 10A decreases, the electric field intensity of the "penetrating" electric field produced between the (+) and (−) electrodes increases, increasing the amount of phase shifting. However, there is an opposing effect in that the decreasing thickness of PLZT layer 1OA results in less distance through which the light can propagate, and this tends to decrease the amount of phase shift produced. These opposing phenomena result in an "optimum" thickness.

FIG. 6 indicates how the 5–15 micron thick layer 10A of PLZT material can be produced. For example, a thick piece of PLZT material can be bonded onto a pyrex microscope slide 46 or the like using a suitable epoxy compound. The pyrex slide 46 is then mounted on a movable piston 34 disposed within a jig or cylinder 36. The position of piston 34 within the jig 36 is established by a number of adjustable positioning assemblies each including a stiff compression spring 35 and an adjustment screw 39 (or equivalent mechanical adjustment device) that adjusts the position of piston 34 within jig 36. One end of compression spring 35 exerts a downward force on piston 34. The opposite end of compression spring 35 exerts an upward force against top member 36A of jig 36. Each adjusting screw 39 extends through a corresponding clearance hole 40 in the top member 36A, through a corresponding compression spring 35, into a corresponding threaded hole 41 in piston 34. The enlarged heads of adjusting screws 39 abut the top surface of top member 36A, and act as limit stops to limit the extended lapping or polishing of PLZT layer 10A by lapping/polishing wheel 37. The uniformity of the thickness of PLZT layer 10A can be adjusted by means of adjusting screw 39.

The assembly is used to press the exposed surface of the PLZT layer 10 against the grinding surface of a metallographic lapping wheel 37. A suitable grinding or polishing compound or grit or substance is provided to obtain the desired amounts of grinding or polishing during various phases of the lapping procedure. The adjusting screws 39 are individually adjusted to control the tilt and pressure of the surface of PLZT layer 10A being lapped or polished. When a suitable surface finish is obtained, that surface can be bonded to a suitable substrate, such as a sapphire substrate having "bottom" electrodes 23 already formed thereoni. The opposite face of the sapphire substrate then could be bonded to a suitable pyrex slide, positioned on piston 34, and the lapping/polishing procedure could be repeated until the desired 5–15 micron thickness of the PLZT layer 10 is achieved. Further processing to provide the top electrodes 22 then could be performed.

Figure 6A:
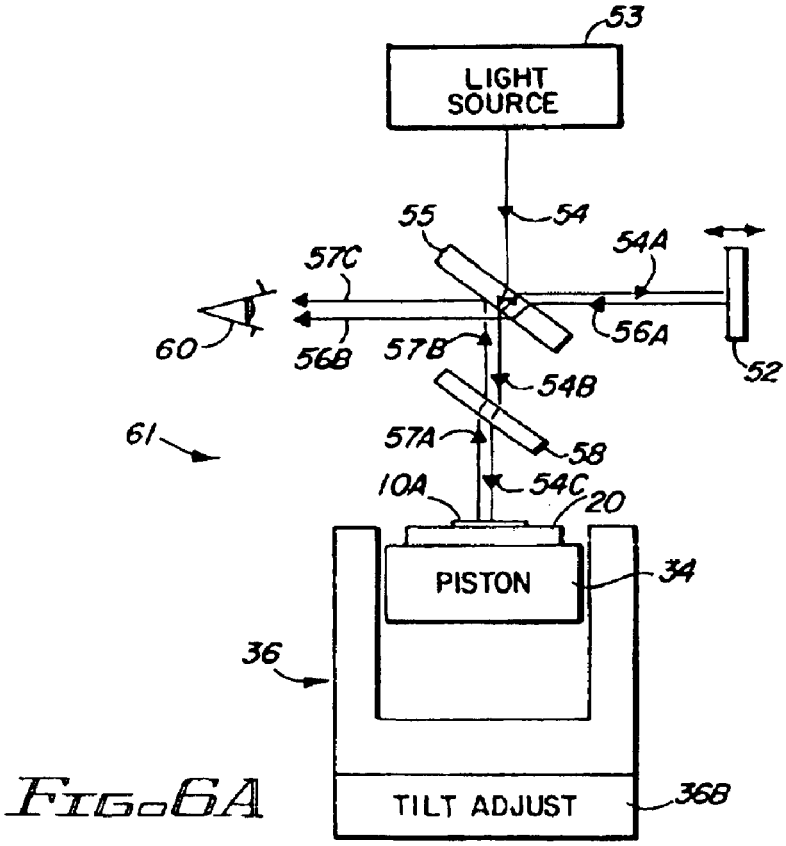
FIG. 6A is a diagram of an interferometric system for measuring the thickness of the PLZT layer being lapped or polished using the device of FIG. 6.

FIG. 6A schematically illustrates how the amount of adjustment by means of screws 39 in FIG. 6 can be determined to provide the distribution of pressure on the surface of PLZT layer 10A needed to achieve uniform thickness of PLZT layer 10A as lapping or polishing progresses. The entire assembly 36 shown in FIG. 6 can be removed from lapping wheel 37 and positioned in an Michelson interfero;meter set-up 61 including a light source 53, a micrometer-adjustable reference mirror 52, a beam splitter 55 and a compensator 58. Rays such as ray 54 from light source 53 are split by beam splitter 55. Part of ray 54 is reflected as ray 54A to reference mirror 52. Part of ray 54 passes through beam splitter 55 and emerjes as ray 54B. Ray 54B passes through compensating element 58 of thickness and composition identical to beam splitter 55 and emerges as ray 54C. Ray 54C then impinges on the surface of the PLZT layer 10A being polished. Ray 54C is reflected as ray 57A, which passes back through compensator 58 and emerges as ray 57B. Ray 57B is reflected by beam splitter 55 as ray 57C. Ray 54A is reflected by reference mirror 52 as ray 56A, which passes through beam splitter 55 and emerges as ray 56B.

Rays 56B and 57C form an interference pattern which can be observed by a detector or human eye 60. The observed fringe pattern can indicate how uniform the surface being polished of PLZT layer 10A is, how thick it is, and how parallel it is to the upper surface of sapphire substrate 20. Light source 53 is initially a laser source. The adjusting screws 39 of the tilt adjust mechanism (shown as block 36B in FIG. 6A) are adjusted to produce a suitable fringe pattern, as observed by human eye 60, indicating the orientation of reference mirror 52 and PLZT layer 10A is precisely 90 degrees.

Figure 6B:
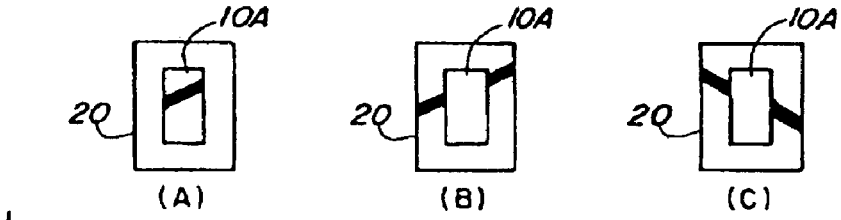
FIG. 6B is a diagram useful in explaining the operation of system of FIG. 6A.

Then the laser light source is replaced by a white light source. A single dark fringe then will be observed if the above distances of reference mirror 52 and PLZT layer 10A from beam splitter 55 are identical to within 0.1 micron. After such a fringe is found, reference mirror 52 is adjusted to obtain a single dark fringe on PLZT layer 10A as indicated in "A" of FIG. 6B, and the reading of the micrometer adjustment of mirror 52 is noted. Then, mirror 52 is again adjusted to produce the single dark fringe on the surface of sapphire substrate 20 as shown in "B" of FIG. 6B. The difference between the two micrometer adjustment readings of the positions of reference mirror 52 is equal to the present thickness of PLZT layer 10A.

If the thickness of PLZT layer 10A is not precisely uniform, the fringe orientation will be different (for example, as in "C" of FIG. 6B) on sapphire substrate 20 than on PLZT layer 10A. If that is the case, the adjustment screws 39 can be adjusted so that as the lapping/polishing continues the pressure of PLZT layer 10A adjust lapping wheel 37 is greatest where the most PLZT material needs to removed so the thickness will be precisely uniform at the end of the lapping and polishing process. One skilled in the art can interpret the observed fringe pattern to determine when the thickness of PLZT layer 10A is uniform, and when the thickness is not uniform, one skilled in the art can readily determine how much to adjust the tilt of piston 34 within jig 36 by adjusting screws 39. The process could be accomplished under computer control in a manufacturing environment to interpret the fringe pattern and, if necessary, adjust the piston tilt for further polishing.

The above technique, by providing PLZT layers in the 5–15 micron thickness range, is a practical way of fabricating PLZT substrates of precisely the thickness needed to achieve the minimum operating voltage at the low point "A" of the PLZT operating voltage versus PLZT thickness curve of FIG. 8.

Figure 7:
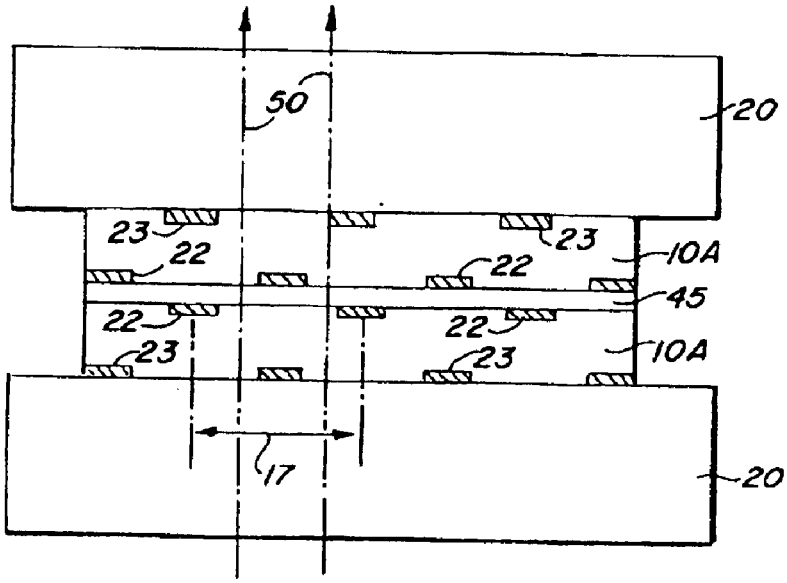
FIG. 7 is a partial section view illustrating a "stacked" or "complex" spatial light modulator having transmission properties which are the combined transmission properties of the stacked individual spatial light modulators.

More complex spatial light modulator structures then can be formed by vertically "stacking" such two-dimensional spatial light modulators one on top of the other, as shown in FIG. 7. For example, in FIG. 7 two two-dimensional spatial light modulators 47 and 48 are vertically stacked, with a deposited layer of transparent insulating material 45 separating the electrodes 22 of spatial light modulator 47 from those of spatial light modulator 48. Numeral 50 indicates light rays passing through a particular pixel, the width of which is indicated by arrow 17. Each of the spatial light modulators 47 and 48 can be similar or identical to the one described with reference to FIG. 2, and the same reference numerals are used in FIG. 7 as in FIG. 2 to designate various parts. Different voltages can be applied to the various electrodes to "address" or "select" various spatial light modulator cells to influence the individual control of the various "pixels" or "voxels" of the complex spatial light modulator.

There are numerous ways to address a two dimensional array of cells. The most prevalent, which is employed in LCD displays is known as active matrix display (AMD). In such a system, the individual cells are designated by their x and y (column and row addresses. Part of the activation voltage is placed on each of the x and y lines aind a transistor which is unique to each cell is activated by the sum of the x and y voltages, but not by any individual x or y voltage. Such transistor then provides the desired activation vfoltage and holds that voltage until that cell is again addressed in a subsequent writing cycle.

Figure 5:
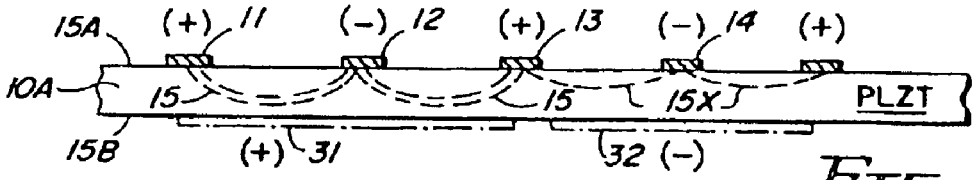
FIG. 5 is a partial section view of a particular type of PLZT spatial light modulator of the present invention using fringing fields in conjunction with transparent electrodes used to modulate the fringing fields by retarding or enhancing them.

FIG. 5 illustrates another spatial light modulator structure of the present invention, in which both positive and negative electrodes 11–14 are formed on the top surface 15A, just as in the prior art structure shown in FIG. 1. However, in FIG. 1, transparent electrodes 31 and 32 are formed on the bottom surface of thin PLZT layer 10A. (For convenience, the thick, transparent substrate on which PLZT layer 10A is attached is not shown.)

The voltages applied to bottom electrode 31 and 32 in FIG. 5 can "modulate" the fringing fields 15 in FIG. 5. For example, a sufficiently positive voltage applied to transparent electrode 31 "enhances" or strengthens the fringing field 15 as shown, producing a strong modulating effect by increasing the intensity of the fringing fields 15. On the other hand, a negative voltage applied to one of the transparent bottom electrodes, for example electrode 32, has the effect of "retarding" or suppressing the fringing field above it. In the example of FIG. 5, fringing field 15X is retarded by the (–) voltage applied to transparent electrode 32.

This feature gives added flexibility in providing x and y select capability to allow convenient x,y addressing of individual pixels iii an array of spatial light modulator cells.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

What is claimed is:

1. A spatial light modulator comprising in combination:

(a) a thin layer of solid-state electro-optical material having parallel, opposite first and second surfaces;

(b) a first electrode disposed on the first surface;

(c) a second electrode disposed on the second surface and laterally displaced relative to the first electrode to thereby produce a lateral electrical field component in the laver in response to a difference between control voltages applied to the first electrode and the second electrode, respectively; and (d) a pixel region in the electro-optical material between a portion of the first electrode and a portion of the second electrode, light selectively passing through the pixel region in response to the difference between the control voltages applied to the first electrode and the second electrode, respectively.

2. A spatial light modulator comprising in combination:

(a) a thin layer of solid-state electro-optical material having parallel, opposite first and second surfaces;

(b) an elongated first electrode disposed on the first surface and generally oriented in a first direction;

(c) a plurality of spaced, elongated second electrodes disposed on the second surface and generally oriented in a second direction, each second electrode being laterally displaced relative to a nearest portion of the first electrode to thereby produce a lateral electrical field component in the laver in response to differences between control voltages applied to the first electrode and to the plurality of second electrode, respectively; and (d) pixel regions in the electro-optical material between portions of the first electrode and portions of the second electrodes, light selectively passing through the pixel regions in response to the differences between the control voltages applied to the first electrode and the plurality of second electrodes, respectively.

3. The spatial light modulator of claim 2 wherein the solid-state electro-.ptical material is PLZT.

4. The spatial light modulator of claim 3 wherein the layer of solid-state electro-optical material has a thickness which results in a minimum activation voltage of the spatial light modulator.

5. The spatial light modulator of claim 4 wherein the layer of solid-state electro-optical material has a thickness in the range of approximately 5 to 15 microns.

6. The spatial light modulator of claim 2 including a transparent substrate attached to the second surface.

7. A spatial light modulator comprising in combination:

(a) a thin layer of solid-state electro-optical material having parallel, opposite first and second surfaces;

(b) an elongated first electrode disposed on the first surface and generally oriented in a first direction;

(c) a plurality of spaced, elongated second electrodes disposed on the second surface and generally oriented in a second direction; and (d) pixel regions in the electro-optical material between portions of the first electrode and portions of the second electrodes, light selectively passing through the pixel regions in response to differences between control voltages applied to the first electrode and the plurality of second electrodes, respectively, wherein the first electrode is of serpentine shape, pixel-defining first portions of the first electrode being oriented in the second direction, second portions of the first electrode between the first portions being oriented in the first direction.

8. A spatial light modulator comprising in combination:

(a) a thin layer of solid-state electro-optical material having parallel, opposite first and second surfaces;

(b) an elongated first electrode disposed on the first surface and generally oriented in a first direction;

(c) a plurality of spaced, elongated second electrodes disposed on the second surface and generally oriented in a second direction; and (d) pixel regions in the electro-optical material between portions of the first electrode and portions of the second electrodes, light selectively passing through the pixel regions in response to differences between control voltages applied to the first electrode and the plurality of second electrodes, respectively, wherein the solid-state electro-optical material is PLZT, wherein the layer of solid-state electro-optical material has a thickness which results in a minimum activation voltage of the spatial light modulator, wherein the layer of solid-state electro-optical material has a thickness of approximately 8 microns.

9. A spatial light modulator comprising in combination:

(a) a thin layer of solid-state electro-optical material having parallel, opposite first and second surfaces;

(b) an elongated first electrode disposed on the first surface and generally oriented in a first direction;

(c) a plurality of spaced, elongated second electrodes disposed on the second surface and generally oriented in a second direction; and (d) pixel regions in the electro-optical material between portions of the first electrode and portions of the second electrodes, light selectively Passing through the pixel regions in response to differences between control voltages applied to the first electrode and the plurality of second electrodes, respectively, wherein the first electrode is of serpentine shape, pixel-defining first portions of the first electrode being oriented in the second direction, second portions of the first electrode between the first portions being oriented in the first direction, the spatial light modulator further including a plurality of thin layers of insulator material disposed on the first surface between the second portions of the first electrode and the electro-optical material.

10. The spatial light modulator of claim 9 wherein the first direction is perpendicular to the second direction.

11. The spatial light modulator of claim 9 including a plurality of the first electrodes, the first electrodes and the second electrodes defining a rectangular array of pixel regions.

12. The spatial light modulator of claim 9 wherein the second electrodes are straight.

13. A method of controlling flow of light through a spatial light modulator, comprising the steps of:

(a) providing a first electrode on a first surface of a thin layer of solid-state electro-optical material, and a second electrode on a second surface of the layer, a portion of the first electrode and a portion of the second electrode bounding a pixel region through which light selectively passes in response to a difference between control voltages applied to the first electrode and the second electrode, respectively; and (b) applying a voltage difference of less than approximately 50 volts between the first electrode and the second electrode to allow Light incident on the spatial light modulator to pass through a pixel region located between the first electrode and the second electrode.

14. A method of controlling flow of light through a spatial light modulator, comprising the steps of:

(a) providing an elongated first electrode on a first surface of a thin layer of solid-state electro-optical material, and a plurality of spaced, elongated second electrodes on a second surface of the layer, portions of the first electrode and portions of the second electrodes bounding pixel regions through which light selectively passes in response to differences between control voltages applied to the first electrode and the plurality of second electrodes, respectively; and (b) applying a voltage difference of less than approximately 50 volts between the first electrode and at least one of the second electrodes to allow light incident on the spatial light modulator to pass through a pixel region bounded by a portion or portions of the first electrode and at least one of the second electrodes, and simultaneously applying a voltage difference of less than approximately 50 volts between the first electrode and the remaining ones of the second electrodes to prevent the incident light from flowing through pixel regions bounded by a portion or portions of the first electrode and the remaining ones of the second electrodes.

* * * * *